W. V. TURNER.
ELECTROFLUID PRESSURE BRAKE.
APPLICATION FILED APR. 26, 1917.
1,281,435.
Patented Oct. 15, 1918.
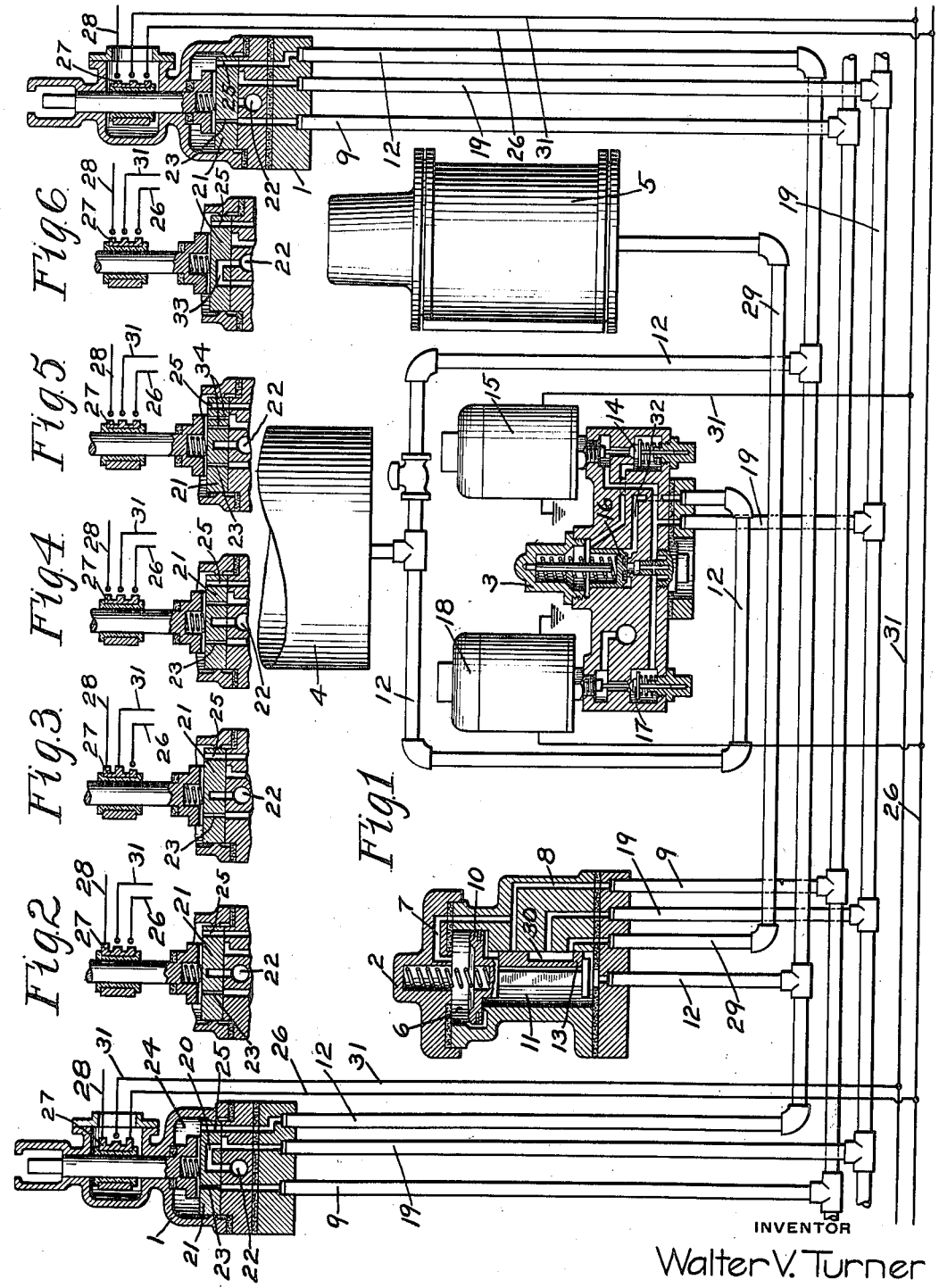
INVENTOR
Walter V. Turner
by Wm. M. Cody
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROFLUID-PRESSURE BRAKE.

1,281,435.  Specification of Letters Patent.  Patented Oct. 15, 1918.

Application filed April 26, 1917. Serial No. 164,640.

*To all whom it may concern:*

Be it known that I, WALTER V. TURNER, a citizen of the United States, residing at Wilkinsburg, in the county of Allegheny and State of Pennsylvania, have invented new and useful Improvements in Electrofluid-Pressure Brakes, of which the following is a specification.

This invention relates to fluid pressure brakes, and more particularly to a fluid pressure brake which is adapted to be controlled electrically.

With a fluid pressure brake of the straight air emergency type, it is usual to employ a restricted port in the brake valve for recharging the brake pipe in releasing the brakes in order to prevent excessive loss of fluid from the source of fluid under pressure, in case of a break-in-two and also to prevent the supply of fluid to the brake pipe at such a rate as might interfere with obtaining an emergency rate of reduction in brake pipe pressure, where initiated by means other than the brake valve, such as by operation of a conductor's valve. The use of a restricted port for recharging the brake pipe, however, interferes with obtaining a quick release of the brakes and furthermore, fluid for recharging the brake pipe throughout the train is taken from the main reservoir on the head car only.

One object of my invention is to provide means for effecting the quick recharge of the brake pipe in which fluid from the main reservoir on each car of the train is supplied to the brake pipe in releasing the brakes.

Another object of my invention is to utilize the straight air pipe for supplying fluid from the main reservoir, through the emergency valve device, when the same is in application position, to the brake pipe.

Another object of my invention is to provide an electro-pneumatic brake in which fluid is electrically supplied to and released from the brake cylinder through the straight air pipe.

Other objects and advantages will appear in the following more detailed description of the invention.

In the accompanying drawing; Figure 1 is a diagrammatic view of a straight air emergency electro-pneumatic brake equipment, partly in section, embodying my invention; and Figs. 2 to 6 inclusive, sectional views of the combined brake valve and switch in the respective positions of electric lap, electric application, intermediate service, full service, and emergency.

As shown in Fig. 1 of the drawing, the equipment may comprise a combined brake valve and switch 1 located at opposite ends of the car, an emergency valve device 2, a magnet valve device 3, a source of fluid under pressure, such as the main reservoir 4, and a brake cylinder 5.

The emergency valve device 2 may comprise a casing having a piston chamber 6, connected by passages 7 and 8 to an emergency brake pipe 9 and containing a piston 10 and having a valve chamber 11 connected to a main reservoir pipe 12 and containing a slide valve 13.

The magnet valve device 3 may comprise a casing containing a pilot application valve 14 adapted to be controlled by a magnet 15, a relay valve piston 16 controlled by valve 14, and a release valve 17 adapted to be controlled by a magnet 18.

In release position, the straight air pipe 19 is connected to the exhaust through a cavity 20 in the rotary valve 21 of the brake valve and exhaust port 22, as shown in the brake valve at the left of Fig. 1. Fluid, in this position, is supplied to the brake pipe 9 through a restricted port 23 in the rotary valve, fluid being supplied to the rotary valve chamber 24 from the main reservoir through pipe 12 and port 25 in the rotary valve.

The electric release wire 26 is connected by the contact 27 of the brake switch with supply wire 28, so that the release magnet 18 is energized to hold the release valve 19 open and permit the exhaust of fluid from the brake cylinder through the brake cylinder pipe 29, cavity 30 in the emergency slide valve 13 and straight air pipe 19 to exhaust port 22 in the brake valve.

An electric application of the brakes is effected by turning the brake valve to electric application position, as shown in Fig. 3 of the drawing, in which the straight air pipe is blanked, the release circuit is opened, to permit the electric release valve 17 to close, and the electric application wire 31 is connected to supply wire 28, so as to energize magnet 15 and effect the opening of pilot valve 14.

Fluid is then vented from the outer face of the relay valve 16 to the straight air pipe 19, so that the valve is shifted to open position, in which fluid is supplied from the main reservoir pipe 12 through passage 32 to straight air pipe 19 and thence through cavity 30 in the slide valve 13 to brake cylinder pipe 29.

The brakes may be held applied by turning the brake valve to electric lap position, as shown in Fig. 2 of the drawing, in which the release magnet is still deënergized, so that the release valve remains closed, and the application magnet is also deënergized, so that the pilot valve 14 is closed, permitting the relay valve 16 to close and thus cut off the further supply of fluid to the brake cylinder.

The brakes may be released by turning the brake valve to release position, in which fluid is released from the brake cylinder as hereinbefore described.

An emergency application of the brakes may be effected by turning the brake valve to emergency position, as shown in Fig. 6 of the drawing, in which the brake pipe 9 is connected by cavity 33 with exhaust port 22. The emergency piston 10 is then shifted to emergency position and fluid is supplied from the valve chamber 11 and the main reservoir to brake cylinder pipe 29.

In releasing the brakes after an emergency application, the brake valve is first turned to electric application position, in which the application magnet 15 is energized to effect the opening of the relay valve 16. Fluid is thereupon vented from the main reservoir to the straight air pipe 19 and thence flows through cavity 30 of the slide valve 13 through passage 8 to the brake pipe 9. The pressure in the brake pipe is thus quickly restored to effect a prompt release movement of the emergency valve piston 10. The brake valve is now moved to release position, in which the electric release valve is opened to effect the quick release of the brakes.

If the electric feature is cut out, a quick release after an emergency application may be effected by turning the brake valve to full service position, as shown in Fig. 5 of the drawing. In this position, fluid is rapidly supplied to the straight air pipe through ports 34 in the rotary valve and thence, as in electric application position, flows through cavity 30 in the emergency slide valve 13 to the brake pipe. After the brake pipe has been charged to main reservoir pressure, the brake valve is turned to release position to complete the release of the brakes.

Having now described my invention, what I claim as new and desire to secure by Letters Patent is:

1. In a fluid pressure brake, the combination with a brake pipe and a straight air pipe, of a brake valve for supplying fluid to the straight air pipe and an emergency valve device for supplying fluid from the straight air pipe to the brake pipe in releasing the brakes.

2. In a fluid pressure brake, the combination with a brake pipe, a straight air pipe, and an emergency valve device operated upon a reduction in brake pipe pressure for effecting an application of the brakes, of a brake valve for supplying fluid to the straight air pipe, and thence through the emergency valve device in application position, to the brake pipe in releasing the brakes.

3. In a fluid pressure brake, the combination with a brake pipe and a straight air pipe, of an emergency valve device operated upon a reduction in brake pipe pressure for effecting an application of the brakes and adapted in application position to connect the straight air pipe to the brake pipe.

4. In a fluid pressure brake, the combination with a brake pipe and a straight air pipe, of an emergency valve device operated upon a reduction in brake pipe pressure for effecting an application of the brakes and adapted in application position to connect the straight air pipe to the brake pipe, and a brake valve having a position for supplying fluid to the straight air pipe.

5. In a fluid pressure brake, the combination with a brake pipe and a straight air pipe, of an emergency valve device having a piston and a slide valve operated by said piston upon a reduction in brake pipe pressure for effecting an application of the brakes, said slide valve having a cavity adapted in application position of the slide valve to connect the brake pipe with the straight air pipe.

6. In an electro-pneumatic brake, the combination with a brake pipe and a straight air pipe, of an electrically controlled valve for supplying fluid to the straight air pipe and an emergency valve device operated upon a reduction in brake pipe pressure for effecting an application of the brakes and adapted in application position to connect the straight air pipe with the brake pipe.

7. In a fluid pressure brake, the combination with a brake pipe, a straight air pipe, and an emergency valve device operated upon a reduction in brake pipe pressure for effecting an application of the brakes, of a brake valve for supplying fluid through the straight air pipe and the emergency valve device to the brake cylinder and an electrically controlled valve for also supplying fluid to the straight air pipe.

8. In a fluid pressure brake, the combination with a brake pipe, a straight air pipe, and an emergency valve device operated upon a reduction in brake pipe pressure for effecting an application of the brakes, of a brake valve for supplying and releasing fluid to and from the straight air pipe and through the emergency valve device to the brake cylinder and electrically controlled means for also supplying and releasing fluid to and from the straight air pipe.

9. In an electro-pneumatic brake, the combination with a brake pipe, a straight air pipe, and a brake cylinder, of an emergency valve device operated upon a reduction in brake pipe pressure for supplying fluid to the brake cylinder and adapted in release position to connect the straight air pipe with the brake cylinder and in application position with the brake pipe and an electrically controlled valve for supplying fluid to the straight air pipe.

10. In an electro-pneumatic brake, the combination with a brake pipe, a straight air pipe, and a brake cylinder, of an emergency valve device operated upon a reduction in brake pipe pressure for supplying fluid to the brake cylinder and adapted in release position to connect the straight air pipe with the brake cylinder and in application position with the brake pipe, an electrically controlled valve for releasing fluid from the straight air pipe, and an electrically controlled valve for supplying fluid to the straight air pipe.

11. In a fluid pressure brake, the combination with a brake pipe, a straight air pipe, and a source of fluid under pressure, of an emergency valve device operating upon a reduction in brake pipe pressure for effecting an application of the brakes and adapted in application position to connect the straight air pipe with the brake pipe and electrically controlled means for supplying fluid from said source to the straight air pipe.

12. In a fluid pressure brake, the combination with a brake pipe, a straight air pipe and a main reservoir, of an emergency valve device operated upon a reduction in brake pipe pressure for effecting an application of the brakes and adapted in application position to connect the straight air pipe with the brake pipe and electrically controlled means for supplying fluid from the main reservoir on each car to the straight air pipe.

In testimony whereof I have hereunto set my hand.

WALTER V. TURNER.